United States Patent
Binion et al.

(10) Patent No.: US 11,709,916 B1
(45) Date of Patent: Jul. 25, 2023

(54) SYSTEM AND METHOD FOR IDENTIFYING CABINETRY

(71) Applicant: STATE FARM MUTUAL AUTOMOBILE INSURANCE COMPANY, Bloomington, IL (US)

(72) Inventors: Todd Binion, Bloomington, IL (US); Joshua M. Mast, Bloomington, IL (US); Jeffrey Wyrick, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 326 days.

(21) Appl. No.: 17/000,811

(22) Filed: Aug. 24, 2020

Related U.S. Application Data

(60) Provisional application No. 63/037,268, filed on Jun. 10, 2020.

(51) Int. Cl.
*G06F 18/22* (2023.01)
*G06N 20/00* (2019.01)
*G06Q 30/0601* (2023.01)
*G06V 10/40* (2022.01)
*G06F 18/214* (2023.01)

(52) U.S. Cl.
CPC ............ *G06F 18/22* (2023.01); *G06F 18/214* (2023.01); *G06N 20/00* (2019.01); *G06Q 30/0639* (2013.01); *G06V 10/40* (2022.01)

(58) Field of Classification Search
CPC .... G06K 9/6201; G06K 9/6256; G06N 20/00; G06Q 30/0639; G06V 10/40
USPC ......................................................... 382/159
See application file for complete search history.

(56) References Cited

U.S. PATENT DOCUMENTS

| | | | |
|---|---|---|---|
| 7,818,148 B2 | 10/2010 | Carey | |
| 7,831,471 B2 | 11/2010 | Adams | |
| 9,129,432 B2 | 9/2015 | Quan et al. | |
| (Continued) | | | |

OTHER PUBLICATIONS

GoCanvas, "Kitchen Measure Form Mobile App," downloaded from the Internet at: https//www.gocanvas.com/mobile-forms-apps/18170-Kitchen-Measure-Form (Mar. 6, 2020).

(Continued)

*Primary Examiner* — Ayodeji O Ayotunde
(74) *Attorney, Agent, or Firm* — Marshall, Gerstein & Borun LLP

(57) ABSTRACT

Systems and methods for analyzing image data to identify cabinet products are disclosed. A computer-implemented method may include receiving, from an electronic device via a network connection, at least one digital image depicting a cabinet. The method also may include analyzing, by one or more processors, the at least one digital image to determine a first set of characteristics of the cabinet. Additionally, the method may include accessing, by the one or more processors from memory, a second set of characteristics corresponding to a plurality of cabinet products and comparing the first set of characteristics to the second set of characteristics to identify a cabinet product of the plurality of cabinet products that matches the cabinet. Further, the method may include transmitting, to the electronic device via the network connection, an indication of the cabinet product.

20 Claims, 6 Drawing Sheets

(56) References Cited

U.S. PATENT DOCUMENTS

| | | | |
|---|---|---|---|
| 10,304,254 | B2 | 5/2019 | Jovanovic et al. |
| 10,430,902 | B1 | 10/2019 | Rawat et al. |
| 10,521,089 | B2 | 12/2019 | Sonnenberg |
| 2010/0211421 | A1 | 8/2010 | Sciammarella et al. |
| 2012/0016773 | A1 | 1/2012 | Strauss |
| 2017/0177748 | A1 | 6/2017 | High et al. |
| 2018/0336732 | A1* | 11/2018 | Schuster ............... G06T 19/006 |
| 2019/0139322 | A1 | 5/2019 | Besecker et al. |
| 2019/0163434 | A1 | 5/2019 | Besecker et al. |
| 2019/0325643 | A1* | 10/2019 | Besecker ........... G06Q 30/0643 |
| 2020/0026923 | A1 | 1/2020 | Henderson |

OTHER PUBLICATIONS

Rosser et al., "Modelling of Building Interiors with Mobile Phone Sensor Data," *ISPRS International Journal of Geo-Information*, vol. 4, pp. 989-1012 (2015).

PLNAR, "Measure / Model Any Space", Smart Picture Tech, downloaded from the Internet at: https://apps.apple.com/us/app/plnar/id1282049921 (Mar. 6, 2020).

Bappy et al., "Real Estate Image Classification," *ResearchGate*, Conference Paper (Mar. 2017).

ITEL website retrieved from the internet at: https://www.itelinc.com/Cabinets.

\* cited by examiner

US 11,709,916 B1

SYSTEM AND METHOD FOR IDENTIFYING CABINETRY

CROSS-REFERENCE TO RELATED APPLICATIONS

This application claims priority to and the benefit of the filing date of U.S. Provisional Patent Application No. 63/037,268, entitled "System and Method for Identifying Cabinetry," filed on Jun. 10, 2020. The entire contents of which are hereby incorporated herein by reference.

TECHNICAL FIELD

The present disclosure generally relates to systems and methods for identifying cabinet products and, more particularly, to systems and methods for identifying cabinet products by analyzing digital images.

BACKGROUND

Generally, if cabinetry in a home or property becomes damaged, the homeowner seeks to repair or replace the damaged cabinetry. However, often only a portion of the cabinets in a room may be damaged. For example, an individual cabinet among several cabinets in a kitchen may need repair. If the homeowner, or a claim representative of the homeowner's insurance provider, cannot locate a replacement cabinet or cabinet product matching the other cabinets, a homeowner may need to replace all of the cabinets, resulting in increased expense.

Manually identifying a cabinetry product can be a difficult task requiring substantial training and experience. While some experienced professionals may be able to identify a "match" with an existing product (i.e., an exact match or a similar replacement product) with fairly high confidence, it may be costly, time consuming, or otherwise not feasible to access such professionals. Further, while object recognition software may be capable of identifying that an object in a photograph is a cabinet, current systems are not capable of identifying a precise cabinet product (e.g., of a specific manufacturer or brand).

Accordingly, there is an opportunity for techniques to automatically identify cabinet products.

SUMMARY

In one embodiment, a computer-implemented method of cabinet product identification is provided. The method includes receiving, from an electronic device via a network connection, at least one digital image depicting a cabinet. The method also includes analyzing, by one or more processors, the at least one digital image to determine a first set of characteristics of the cabinet. The method further includes accessing, by the one or more processors from memory, a second set of characteristics corresponding to a plurality of cabinet products and comparing the first set of characteristics to the second set of characteristics to identify a cabinet product of the plurality of cabinet products that matches the cabinet. Further, the method includes transmitting, to the electronic device via the network connection, an indication of the cabinet product.

In another embodiment, a computing system for cabinet product identification is provided. The computing system includes a transceiver in communication with an electronic device via a network connection, one or more processors, and a program memory storing instructions. When executed by the one or more processors, the instructions cause the one or more processors to: (1) receive, from an electronic device via the transceiver, at least one digital image depicting a cabinet; (2) analyze the at least one digital image to determine a first set of characteristics of the cabinet; (3) access from memory a second set of characteristics corresponding to a plurality of cabinet products; (4) compare the first set of characteristics to the second set of characteristics to identify a cabinet product of the plurality of cabinet products that matches the cabinet; and (5) transmit, to the electronic device via the transceiver, an indication of the cabinet product.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

Figure 1:
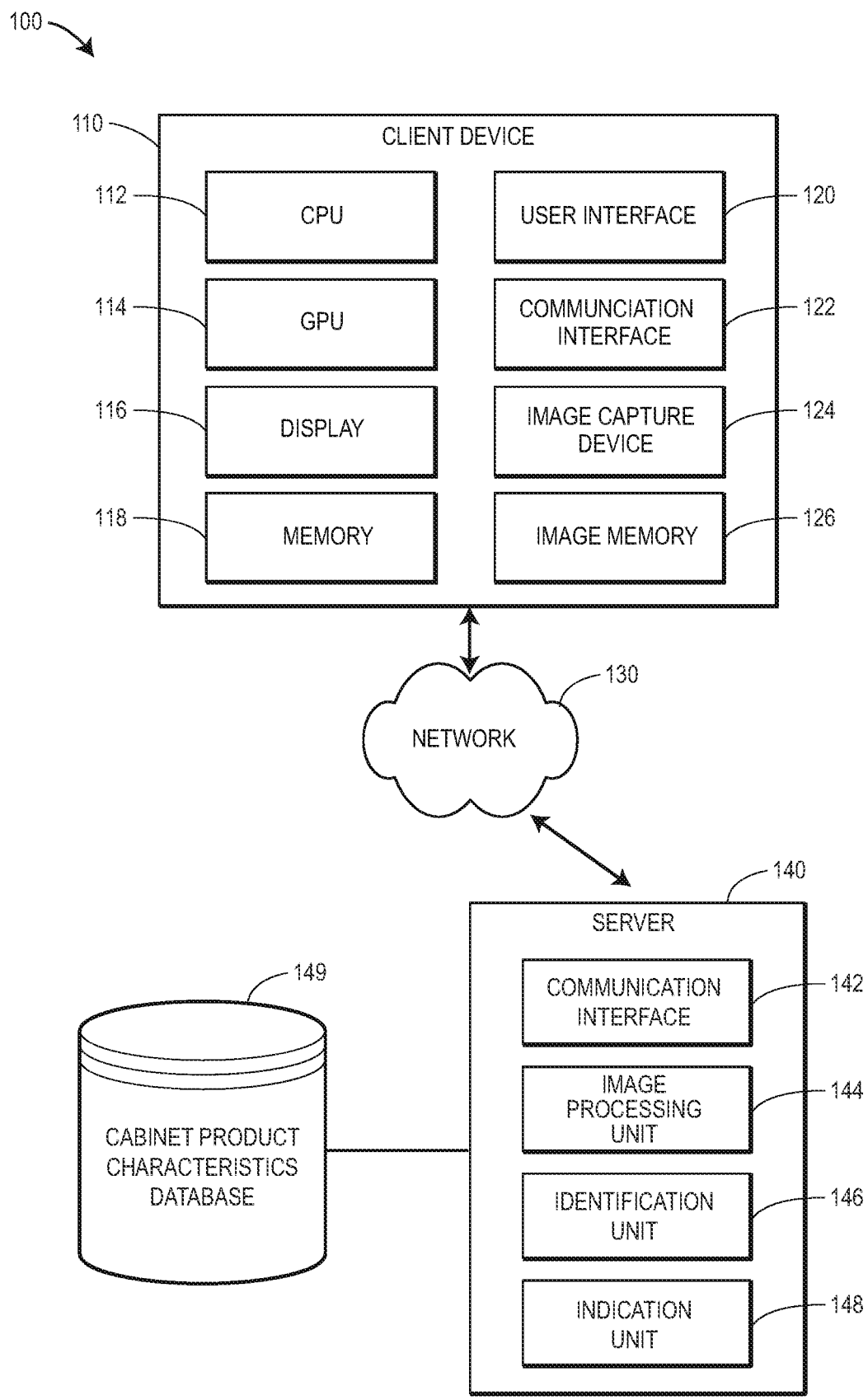
FIG. 1 depicts a block diagram of an example system for identifying cabinet products, in accordance with some embodiments.

The present embodiments may relate to system and methods for, inter alia, analyzing digital images in order to identify matching cabinet products and locating available replacement cabinet products. Conventionally, manual techniques are used to examine a damaged cabinet product and to identify matching cabinet products. However, these techniques are expensive and inefficient, and generally require extensive training. To alleviate these shortcomings, the present embodiments incorporate image processing to effectively, efficiently, and accurately identify a cabinet product.

According to certain aspects, systems and methods may capture and/or access digital image data that depicts a cabinet, and analyze the digital image data to determine a set of characteristics of the cabinet. For example, an individual (e.g., a homeowner or insurance claim representative) can use a mobile device to capture one or more images of a cabinet, send the images to a server via a wireless link, and receive from the server information indicating a matching and/or similar cabinet product. The mobile device may execute a software application that guides the individual through the process of taking one or more images of the cabinet, sending the pictures to the server, and receiving information from the server (e.g., an indication of a matching and/or similar product or products, identified characteristics of the cabinet, etc.), for example.

To identify a cabinet product matching a cabinet depicted in an image, the server may utilize one or more image processing techniques to determine a set of characteristics of the cabinet. The server can compare the identified characteristics to characteristics corresponding to known cabinet products that are stored in a memory, such as a characteristics database. Based on the comparison, the server can identify a known cabinet product with characteristics matching those of the cabinet in the image (e.g., within a particular tolerance). In some scenarios, the server may apply a machine learning model trained using images of known cabinet products to locate a known cabinet product with characteristics matching any characteristics of the cabinet extracted from the image.

As used in this disclosure, "cabinet product" can refer to a complete cabinet or to one or more cabinet components (e.g., a cabinet box, drawers, doors, cabinet framing, molding, hardware, etc.) Accordingly, the cabinet product that the server identifies as a matching cabinet product may be a complete cabinet that matches the unknown cabinet in the image, or may be a cabinet component that matches the unknown cabinet in the image (e.g., any combination of one or more of a cabinet box, drawers, doors, cabinet framing, hardware, molding, etc.). For example, the server may identify a molding product that matches molding of the unknown cabinet, or a cabinet door that matches the door of the unknown cabinet.

The identification of the cabinet product can be used in various ways, depending on the implementation and/or scenario. For example, a homeowner or insurance claim representative may use the identified product to estimate a cost of replacement or repair. A homeowner can replace a damaged cabinet with the matching cabinet, avoiding excess costs associated with replacing all of the cabinets in a room or home. As another example, the measurements and identified characteristics can also be exported to rendering and/or computer-aided design (CAD) software to produce models of identified products.

The systems and methods disclosed herein offer numerous benefits. In particular, by analyzing image data, the systems and methods are able to accurately determine cabinet characteristics and identify matching cabinet products. These techniques are performed automatically by a computer system, increasing the speed and accuracy of cabinet identification techniques and eliminating subjective manual techniques. It should be appreciated that other benefits are envisioned.

The systems and methods discussed herein address a challenge that is particular to technology associated with identifying cabinet products. In particular, the challenge relates to a difficulty in effectively and efficiently identifying a cabinet product. In conventional situations, entities rely on human judgement to identify a cabinet product, which is often time-consuming and/or inaccurate. In contrast, the systems and methods utilize image processing techniques to analyze image data depicting cabinets and identify cabinet products that may be depicted in the image data. Therefore, because the systems and methods employ the collection, analysis, and communication of image data, the systems and methods are necessarily rooted in computer technology in order to overcome the noted shortcomings that specifically arise in the realm of technology associated with identifying cabinet products.

FIG. 1 depicts an example system 100 configured to implement the cabinet product identification techniques of this disclosure. It should be appreciated that the system 100 is merely an example and that alternative or additional components are envisioned.

The system 100 may include a client device 110 configured to communicate with a server 140 via a network 130. The network 130 may include any suitable combination or wired and/or wireless communication networks, and may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

The server 140 may include a communication interface 142, an image processing unit 144, an identification unit 146, and an indication unit 148. In other embodiments, the server may include additional, fewer, or different components and/or units than those shown in FIG. 1. The communication interface 142 may be configured to communicate with (i.e., transmit data to and receive data from) remote computing devices, including the client device 110, via the network 130. The communication interface 142 may include multiple different communication interfaces, such as multiple hardware ports and associated software and/or firmware. For example, the communication interface 142 may include one or more transceivers (e.g., WWAN, WLAN, and/or WPAN transceivers) functioning in accordance with IEEE standards, 3GPP standards, or other standards.

As will be discussed in greater detail below, the image processing unit 144 may generally be configured to identify the cabinet products based upon the determined characteristics (and a cabinet product characteristics database 149 communicatively coupled to the server 140), and the indication unit 148 may generally be configured to send information corresponding to the output of the identification unit 146 to one or more computing devices (e.g., the client device 110) and/or computing systems (e.g., a claim processing or underwriting system).

In one implementation, each of units 144, 146, and 148 is, or includes, a respective set of one or more processors that executes software instructions to perform the functions described in this disclosure, or some or all of the units 144, 146, and 148 may share a set of one or more processors. In some implementations, one or more of the units 144, 146, and 148 may be a component of software that is stored on a computer-readable medium (e.g., a non-volatile memory of the sever 140) and is executed by one or more processors of the server 140.

The client device 110 may be any type of electronic device such as a smartphone, tablet, phablet, laptop, or any other suitable computing device. While FIG. 1 illustrates only a single client device, it should be appreciated that any number of client devices may communicate with the server 140. The client device may include a central processing unit (CPU) 112, a graphics processing unit (GPU) 114, a user interface 120, a display 116, a communication interface 122, an image capture device 124, a memory 118, and an image memory 126. In other embodiments, however, the client device 110 may include additional, fewer, or different components and/or units that those shown in FIG. 1. For example, the client device 110 may include additional input/output devices such as a microphone and/or speaker.

The memory 118 may include a computer-readable, non-transitory storage device having any combination of volatile (e.g., random access memory (RAM) and/or non-volatile memory (e.g., read only memory (ROM), Flash, etc.). The memory 118 may store instructions that, when executed by the CPU 112 and/or the GPU 114, cause the CPU 112 and/or the GPU 114 to perform various functions, such as the functions described in this disclosure. The image memory 126 may store images captured by the image capture device 124, and/or images obtained from an external source. The image memory 146 may include a non-volatile memory, for example.

The display 116 may include a screen (e.g., smartphone or tablet screen, or laptop monitor) for displaying information to a user. The user interface 120 may be configured to enable a user to interact with the client device 110. For example, the user interface 120 may include an interactive feature of the display 116 (e.g., the display 116 may be a touchscreen), a keyboard, a voice input device, and/or any other suitable user-input device(s).

The communication interface 122 may include one or more communication interfaces such as hardware, software, and/or firmware of an interface for enabling communications via a cellular network, a WiFi network, or any other suitable network such as the network 130. The client device 110 may be configured to communicate with the server 140 via the communication interface 122.

The image capture device 124 is configured to capture digital images. The image capture device 124 may be implemented as a camera integrated within the client device 110, or, in some embodiments, may be external and communicatively coupled to the client device 110. For example, the image capture device 124 may be an external camera communicatively coupled to the client device 110 via a Bluetooth link. A user may operate the image capture device 124 to capture one or more digital image(s) of one or more cabinet product(s), and the client device 110 may store the image(s) in the image memory 146, or in another memory not shown in FIG. 1 (e.g., a cloud-based memory external from the client device 110). Each image may depict one more cabinet products.

In some implementations, the client device 110 may execute a dedicated software application (e.g., an application corresponding to instructions stored in the memory 118 or at a cloud-based memory) that facilitates the cabinet identification techniques of this disclosure. For example, the application may, when executed by the CPU 112 and/or the GPU 114, cause the display 116 to present to the user of the client device 110 a graphical user interface (GUI). The GUI may include one or more interactive controls that enable the user to capture the image(s) of the cabinet products with the image capture device 124, and/or to select/retrieve image(s) stored in the image memory 126 or from another memory communicatively coupled to the client device 110. The interactive controls may also enable the user to retrieve notifications received at the client device 110 indicating a matching or similar cabinet product. Exemplary interfaces of such an application are discussed below with respect to FIGS. 5A-5B.

The image(s) of the cabinet products may be transferred from the client device 110 to the server 140 via any suitable method. For example, if the client device 110 is executing the application discussed above, the GUI may include a first interactive control that enables the user to capture new cabinet product images or select previously taken images stored in the image memory 146, and a second interactive control that enables the user to send captured and/or selected images from the client device 110 to the server 140 (e.g., directly via the communication interface 130, or by causing a cloud-based server to send the image(s) to the server 140).

The server 140 can receive the images via the communication interface 142. The image processing unit 144 can analyze the images using one or more image processing techniques and/or object recognition techniques to determine a set of characteristics of the cabinet (or cabinet product) depicted in the image. Example characteristics are discussed below with reference to FIG. 2A-2B.

After the image processing unit 144 has determined a set of characteristics of the cabinet depicted in the images, the identification unit 146 may use the determined characteristic set to identify a cabinet product with matching characteristics (or similar, e.g., within a predetermined tolerance). To identify a matching product, the identification unit 146 may access a memory of the server 140 or a cabinet product characteristics database 149. The cabinet product characteristics database 149 may be a memory internal or external to the server 140. In some implementations, the database 149 is implemented using cloud technology and may reside on a distributed network of computing devices rather than a single computing device. Further, the database 149 may include multiple databases, which may be operated by different entities.

The cabinet product characteristics database 149 may include tables or other suitable data structures storing characteristics associated with known cabinet products. For example, an entry in the database 149 may correspond to a particular product and include characteristics (e.g. manufacturer, color, dimensions, etc.) of that product. The database entries may also indicate a cost of the product and/or locations (e.g., a retail store or website) where the product is available for purchase. The database 149 may be maintained by an entity, such as an insurance provider, associated with the server 140, or by one or more third-parties. For example, the database 149 may include databases operated by or more cabinet product manufacturers, and each database may include entries corresponding to products made by a respective cabinet product manufacturer.

In some implementations, entries in the database 149 may be generated by the server 140, or by another computing device communicatively connected to the database 149. For example, the image processing unit 144 may identify characteristics of a known cabinet product, and store the characteristics in an entry corresponding to the known cabinet product. A human may manually check the identified characteristics to ensure that the stored characteristics are accurate. In some implementations, machine learning techniques may be utilized to identify characteristics of known products. For example, a machine learning model may be trained, using a training set including images of known cabinet products, to identify image features corresponding to cabinet characteristics. The machine learning model can be applied to images of known cabinet products to extract characteristics of the products, and can store these extracted characteristics in entries corresponding to the products in the database 149. Such machine learning techniques are described below with reference to FIG. 3.

The identification unit 146 may compare the characteristics of the cabinet identified by the image processing unit 144 to the characteristics of the cabinet products in the database 149 to identify one or more cabinet products matching the cabinet. The rules or algorithms for determining whether a particular product in the database 149 matches (or is similar to) the cabinet in the images may vary according to different embodiments, as will be described with respect to FIGS. 2A-2B. Further, machine learning techniques may be utilized to identify, based on identified characteristics, a matching cabinet product. As will be discussed with reference to FIG. 3, the functions of one or both of the image processing unit 144 and the identification unit 146 may be performed by one or more machine learning models.

After the identification unit 146 has identified one or more matching (and/or similar) product(s), the indication unit 148 may transmit an indication of the matching product(s) to at least one computing device via the communication interface 142. In some implementations, the indication unit 148 may transmit the indication to the client device 110. For example, the indication unit 148 can generate a message including information corresponding to the matching product(s) and transmit this message to the client device 110, via the communication interface 142. If the client device 110 executes a dedicated software application, the GUI of the application may present the information on the display 116 of the client device 110, as discussed with reference to FIG. 5B. Additionally or alternatively, the indication unit 148 may transmit the indication to another computing device not depicted in FIG. 1, such as a computing device associated with an insurance provider. Such a computing device may use the information to automatically populate one or more data fields relating to an insurance claim (e.g., to facilitate determining a repair or settlement cost).

The indication may include information corresponding to the matching product(s), such as an identification of the product(s) (e.g., a manufacturer, a part or model number, a product name, etc.). The indication may also include information indicating where a matching product is available for purchase (e.g., the name, contact information, website link, and/or address of a retail store or retailer). Depending on the embodiment, the indication may indicate whether the product is "matching" (e.g., similar above a first threshold), or similar (e.g., similar below the first threshold but above a second threshold). The server 140 may retrieve the information corresponding to the matching product(s) from the database 149. In some embodiments, the server 140 may retrieve additional information from another data source (e.g., a database and/or a server of a manufacturer of a matching product) after the identification unit 146 identifies a matching product.

While this disclosure primarily refers to the server 140 as performing cabinet product identification (e.g., the functions of the units 144, 146, and 148), the client device 110 can implement some or all of the functionality of the server 140, depending on the implementation and/or scenario. For example, the client device 110 may include one or more of the image processing unit 144, the identification unit 146, or the indication unit 148, and may access the database 149 via the network 130.

Example characteristics of a cabinet, and techniques to (i) identify and (ii) match these characteristics to a known cabinet product, are discussed below with reference to FIGS. 2-6.

Figure 2A:
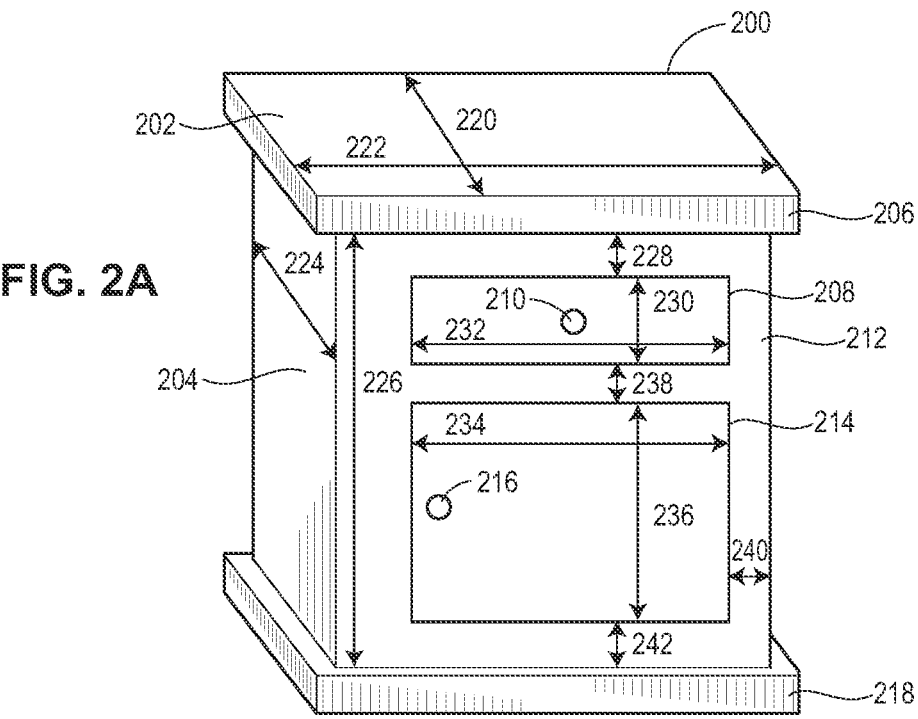
FIGS. 2A-2B depict an example cabinet product that may be identified using the techniques disclosed herein.
Figure 2B:
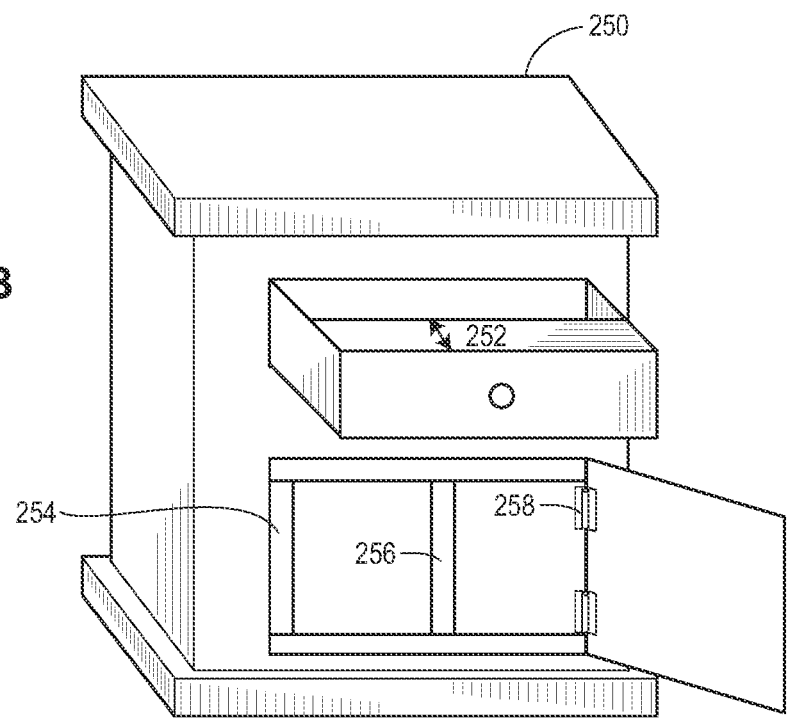

FIGS. 2A-2B depicts an example cabinet product that the components of FIG. 1A can identify using the techniques within this disclosure. FIG. 2A depicts a first view of a cabinet 200, and FIG. 2B depicts a second view of the cabinet 200. Accordingly, FIGS. 2A-2B may correspond to different images of the cabinet 200 captured from different viewing angles and/or in different scenarios. For example, FIG. 2B shows the cabinet 200 of FIG. 2A after a drawer 208 and a cabinet door 214 of the cabinet have been opened. The cabinet 200 may include a top panel 202, side panel 204, front panel 212, top molding 206, bottom molding 218, drawer 208, and a cabinet door 214. The cabinet 200 also may include hardware such as a drawer pull 210 or door handle 216.

Based on images of the cabinet 200, the image processing unit 144 can determine characteristics of the cabinet 200 and/or the components of the cabinet 200 (e.g., panels 202, 204, 208, moldings 206 and 218, drawer 208, door 214, pull 210, or handle 216). The image processing unit 144 may determine a characteristic based on one image, or based on a combination of multiple images, which may or may not depict the cabinet from different angles or in different scenarios (e.g., with the doors and/or drawers closed). In some implementations, the image processing unit 144 may determine a first value of a characteristic based on one image, and a second value of the same characteristic based on another image, and compare the values to ensure a consistent result. The image processing unit 144 may determine multiple characteristics based on the same image, or based on different images.

As a first example of the characteristics the image processing unit can identify, the image processing unit 144 can determine a material type, color, texture, or finish of the cabinet 200 or a component of the cabinet 200. If the cabinet 200 is made of wood, the image processing unit 144 can determine a wood type and/or wood grain used in the cabinet 200. The server 140 can also determine a manufacturer or brand of the cabinet 200. In some implementations, the server 140 can determine a manufacturer or brand based on a marking appearing in the digital image (e.g., a sticker, label, tag, logo, etc.). For example, the image processing unit 144 may identify a marking as a logo or band marking, and the identification unit 146 may match the marking to a particular manufacturer. Alternatively or in addition, the server 140 can determine the manufacturer by determining other characteristics of the cabinet and comparing these determined characteristics to those of the manufacturer's products. The image processing unit 144 may also determine a number of drawers and/or doors of the cabinet 200.

Additional characteristics the image processing unit 144 can determine include various dimensions of the cabinet. For example, the image processing unit 144 may identify a depth 220 and width 222 of the top panel 202, which may be covered by a countertop (e.g., a kitchen counter). Other dimensions include a depth 224 of the side panel 204 or the cabinet 200, a height 226 of the front panel 212, a width of the front panel 212, a distance 228 between the molding 206 or top of the cabinet 200 and the drawer 208, a distance 238 between the drawer 208 and the door 214, a distance 240 between the cabinet door 214 and side of the cabinet 200, a distance between the bottom of the door 214 and the molding 218 or bottom of the cabinet 200, a width 232 and a height 230 of the drawer 208, and a width 234 and a height 236 of the door 214. If the drawer 208 and the door 214 are open in the images, the image processing unit 144 can determine other dimensions such as the depth 252 of the drawer. FIGS. 2A-2B include labels for several dimensions of the cabinet 200, but it should be appreciated that the image processing unit 144 can determine a dimension of any portion of the cabinet 200, or cabinet component, that is depicted in one or more images. The image processing unit 144 can also analyze several images in combination in order to estimate a dimension of a component that appears in more than one image.

Additionally, the image processing unit 144 can determine a type of the cabinet 200. For example, the image processing unit 144 can determine whether the cabinet 200 is an upper, lower, or island cabinet. The image processing unit 144 may determine the type based on images of the cabinet 200 alone, or of the cabinet 200 and other cabinets arranged next to or in the same room as the cabinet 200. While or after capturing an image, for example, a user can indicate a particular cabinet of interest among neighboring cabinets by interacting with the GUI of a dedicated software application.

The image processing unit 144 can also determine a design or decorative style of the cabinet 200, or of a particular component of the cabinets, such as the drawer 208 or the door 214. Example door and/or drawer designs include: slab or flat panel, raised panel, recessed panel, etc. Example styles include shaker, modern, louvered, cathedral, etc. The image processing unit 144 can also determine whether the door 214 includes glass.

Further, the image processing unit 144 may also determine types and/or styles of trim and/or molding (e.g., the moldings 206 and 208) of the cabinet 200. The door 214 and/or drawer 208 may also include molding that the image processing unit 144 can identify. The GUI may present instructions to a user to capture one or images of the molding such that the image processing unit 144 can determine a cross-section of the molding and thus determine a style of the molding.

Additional characteristics the image processing unit 144 can identify may relate to cabinet hardware. For example, the image processing unit 144 can determine the number and placement of drawer pulls, door handles, and other hardware (e.g., such as the drawer pull 210 and handle 216). The image processing unit 144 may also determine a type (e.g., whether hardware is for a cabinet drawer or door), shape, style, etc. of hardware.

Using images of the cabinet with the door 214 in an open position, as in FIG. 2B, the image processing unit 144 can determine additional characteristics of the cabinet 200. For example, the image processing unit 144 can determine a number, style, and/or placement of one or more hinge(s) 258. As another example, the image processing unit 144 can determine a frame style of the cabinet (e.g. whether the cabinet 200 includes a face frame 254 and/or a central rail 256).

In addition, by analyzing characteristics of the cabinet 200 that the image processing unit 144 identifies, the server 140 may determine further characteristics. For instance, by analyzing identified characteristics, the server 140 may determine that the cabinet 200 is a custom cabinet or a pre-fabricated cabinet. The server 140 also may determine that the cabinet 200 is of high quality or low quality (e.g., based on correlating the identified characteristics to characteristics associated with cabinets above or below a predetermined cost or value).

The server 140 may also determine characteristics of the cabinet 200 based on other information provided by the client device 110 in addition to images. In some implementations, a dedicated software application may present, via the display 116 or other output device (e.g., a speaker) of the client device 120, prompts to a user requesting additional information regarding the cabinet 200. For example, the application can prompt the user to indicate (e.g., by making a selection using the user interface 120) whether the drawer 208 is a soft- or slow-close drawer, whether the cabinet interior includes shelves that pull out, or other suitable questions that may assist the identification.

The identification unit 146 analyzes the identified characteristics of the cabinet 200 to determine one or more matching (and/or similar) cabinet product(s). As mentioned above, the rules or algorithms for determining whether a particular product in the database 149 matches (or is similar to) the cabinet 200 may vary according to different embodiments.

To determine a matching cabinet product, the identification unit 146 can compare the identified characteristics to the characteristics in the database 149. For the identification unit 146 to identify a cabinet product as a "matching" cabinet product, the cabinet product may need to have one or more (e.g., two, three, or other predetermined number) characteristics that match the identified characteristics set, or may need to have characteristics that match a certain proportion of the identified characteristics (e.g., more than 70%, 80%, or 90%). The identification unit 146 may determine that a product matches the cabinet 200 if the characteristics in the database 149 are within predetermined tolerances of the corresponding characteristics in the identified characteristic set (or vice versa).

How the identification unit 146 identifies a matching characteristic may vary by the type of characteristic. For example, a matching color may have similar (e.g., as determined based on a measured color distance) RGB color values to an identified color. A matching dimension may be similar to within a suitable threshold of an identified measurement (e.g., within the uncertainty of the estimated measurements of the image processing unit 146, or within thresholds on the order of centimeters or millimeters).

Based on the number and/or proportion of identified characteristics that match a given product, and/or how well (e.g., within what threshold) each characteristic matches the corresponding identified characteristic, the identification unit 146 may calculate a similarity score. The similarity score may be based on a qualitative scale (e.g., including scores such as "matching," "high," or "low"), or on a quantitative scale (e.g., from 0-100 or 0-10). To determine the similarity score, the identification unit 146 may weight different characteristics differently. For example, whether the dimensions, door, and/or drawer style of the cabinet 200 match a known product may be weighted more than whether the hardware style matches, as hardware can be an after-market addition made by an entity different than the original cabinet manufacturer.

Figure 3:
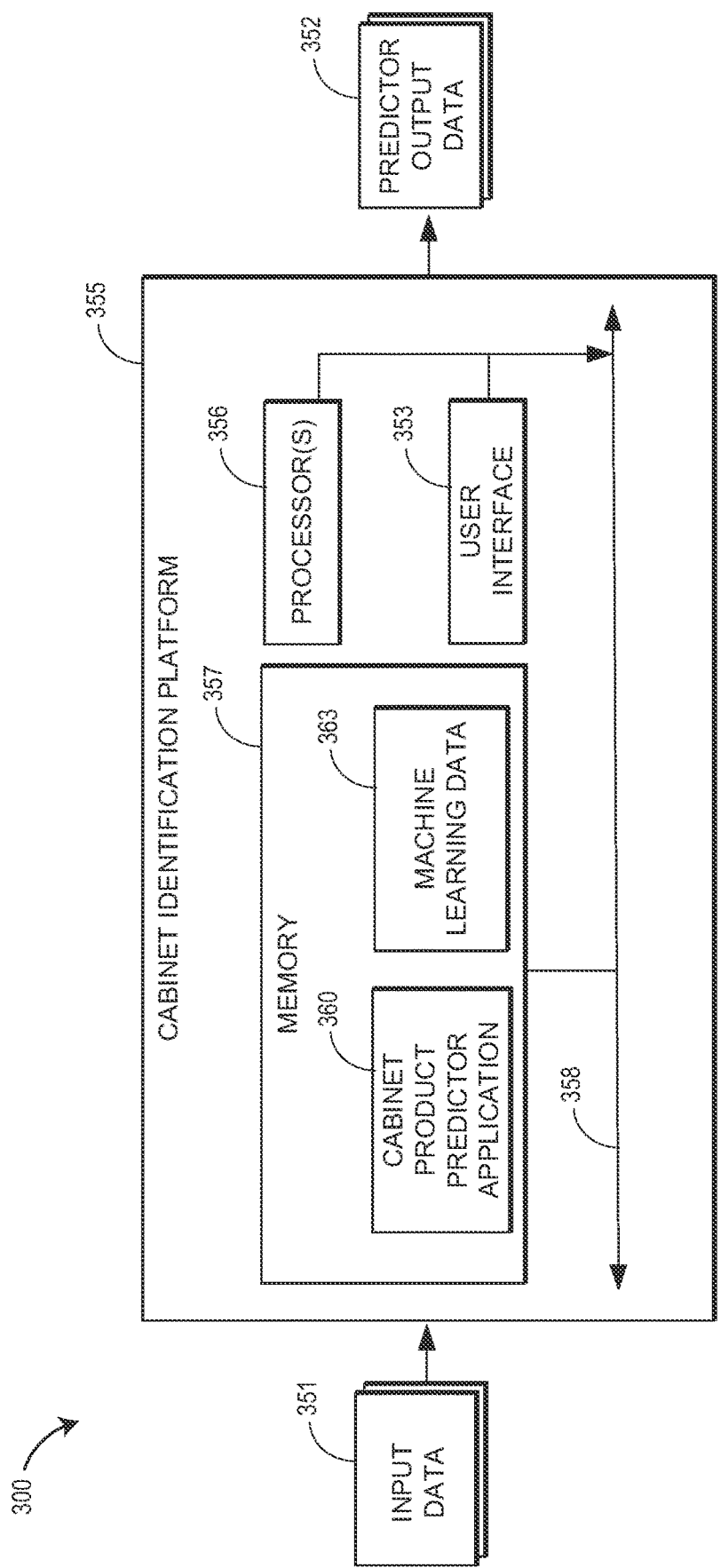
FIG. 3 depicts a block diagram of an example platform for generating and applying machine learning models to identify cabinet products, in accordance with some embodiments.

As mentioned above, in some embodiments, the image processing unit 144 and/or the identification unit 146 may be implemented using machine learning techniques. For instance, the image processing unit 144 may apply a first machine learning model to image data to identify image features corresponding to cabinet characteristics, such as those discussed above. The identification unit 146 may apply a second machine learning model to match identified characteristics to a cabinet product. The input to the second machine learning model, identified cabinet characteristics, may be the output from the first machine learning model, or may be the output of other image processing or object detection techniques. In some embodiments, the functions of the image processing unit 144 and the identification unit 146 may be combined, and may both be performed by a single machine learning model. The machine learning model may, for example, take an image as input, and produce a prediction of the cabinet product depicted in the image. FIG. 3 depicts an example environment in which devices may generate and operate machine learning model(s) to perform the above-described functionalities.

In particular, FIG. 3 depicts an example environment 300 in which a set of input data 351 is processed into predictor output data 352 via a cabinet identification platform 355, according to embodiments. In one implementation, the set of input data 351 may be a training dataset. The cabinet identification platform 355 may be implemented on the server 140 of FIG. 1A, or on another computing device communicatively coupled to the server 140 via the network

130. In some implementations, the cabinet identification platform 355 may be implemented on the client device 110.

Components of the cabinet identification platform 355 may include, but are not limited to, a processing unit (e.g., processor(s) 356), a system memory (e.g., memory 357), and a system bus 358 that couples various system components including the memory 357 to the processor(s) 356. The cabinet identification platform 355 may further include various communication components (e.g., transceivers and ports) that may facilitate data communication with one or more additional computing devices, such as the server 140 and the client device 110.

In some embodiments, the processor(s) 356 may include one or more parallel processing units capable of processing data in parallel with one another. The system bus 358 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The cabinet identification platform 355 may further include a user interface 353 configured to present content (e.g., the content of the input data 351 and information associated therewith). Additionally, a user may make selections to the content via the user interface 353, such as to navigate through different information, review certain input data, and/or perform other actions. The user interface 353 may be embodied as part of a touchscreen configured to sense touch interactions and gestures by the user. Although not shown, other system components communicatively coupled to the system bus 358 may include input devices such as a cursor control device (e.g., a mouse, trackball, touch pad, etc.) and keyboard (not shown). A monitor or other type of display device may also be connected to the system bus 358 via an interface, such as a video interface. In addition to the monitor, the cabinet identification platform 355 may also include other peripheral output devices such as a printer, which may be connected through an output peripheral interface (not shown).

The memory 357 may include a variety of computer-readable media. Computer-readable media may be any available media that can be accessed by the cabinet identification platform 355 and may include both volatile and nonvolatile media, and both removable and non-removable media. By way of non-limiting example, computer-readable media may comprise computer readable storage media, which may include volatile and nonvolatile, removable and non-removable media implemented in any method or technology for storage of information such as computer-readable instructions, routines, applications (e.g., a cabinet product predictor application 360), data structures, program modules, or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the processor(s) 356 of the cabinet identification platform 355.

The cabinet identification platform 355 may store and execute the cabinet product predictor application 360. The cabinet product predictor application 360 may employ machine learning techniques such as, for example, a regression analysis (e.g., a logistic regression, linear regression, or polynomial regression), k-nearest neighbors, decision trees, random forests, boosting, neural networks, support vector machines, deep learning, reinforcement learning, Bayesian networks, or the like. When the data 351 is a training dataset, the cabinet product predictor application 360 may analyze/process the data 351 to generate the machine learning model for storage as part of machine learning data 363 that may be stored in the memory 357.

When the data 351 comprises data associated with a cabinet to be analyzed using the machine learning model, the cabinet product predictor application 360 may analyze or process the data 351 using the machine learning model to generate a set of output values. Additionally, the cabinet product predictor application 360 may add, to the machine learning model, additional cabinet product identification results so that the cabinet product predictor application 360 may use the updated machine learning model in subsequent input data analysis.

As a first example, the input data 351 may include a training dataset including image data depicting cabinets. The cabinet product predictor application 360 may generate a first machine learning model by training the model to identify cabinet characteristics from the image data. After the first machine learning model is trained, the input data 351 may include images depicting an unknown cabinet, such as images received at the server 140 and captured by the client device 110. The cabinet product predictor application 360 may analyze the data 351 using the first machine learning model to generate predictor output data 352 including identified cabinet characteristics of the depicted cabinet. In this example, the image processing unit 144 discussed with reference to FIG. 1 may utilize the first machine learning model to identify cabinet characteristics. Further, the first machine learning model may be applied to images of known cabinet products, and the results may be stored in the cabinet product characteristics database 149, as discussed above.

As a second example, the input data 351 may include a training dataset including image data and/or descriptions of cabinet characteristics. For example, the training data set may include images of known cabinet products and/or characteristics of the known cabinet products. In some embodiments, the training dataset may include data from the cabinet product characteristics database 149. The cabinet product predictor application 360 may generate a second machine learning model by training the model to identify a cabinet product matching the cabinet characteristics. After the second machine learning model is trained, the input data 351 may include cabinet characteristics of an unknown cabinet. The cabinet characteristics of the unknown cabinet may be characteristics identified by the first machine learning model or by other image processing or object detection techniques. The cabinet product predictor application 360 may analyze the data 351 using the second machine learning model to generate predictor output data 352 including an identified cabinet product matching the cabinet characteristics of the unknown cabinet and/or one or more similar cabinet products. In this example, the identification unit 146 may utilize the second machine learning model to identify a matching product.

In various embodiments, the cabinet identification platform 140 may train and apply a machine learning model that can perform the functions of both the first and the second example machine learning models (i.e., the functions of both the image processing unit 144 and the identification unit 146). For example, the input data 351 may include images depicting an unknown cabinet, such as images received at the server 140 and captured by the client device 110. The cabinet product predictor application 360 may analyze the data 351 using the machine learning model to generate predictor output data 352 including an identified cabinet product matching the depicted cabinet (and/or one or more similar cabinet products). The predictor output data 352 may also include identified characteristics of the depicted cabinet.

The cabinet identification platform 355 can pass the predictor output data 352 to, for example, the identification unit 146 for further processing if the predictor output data 352 includes identified characteristics of the cabinet, or to the indication unit 148.

Figure 4:
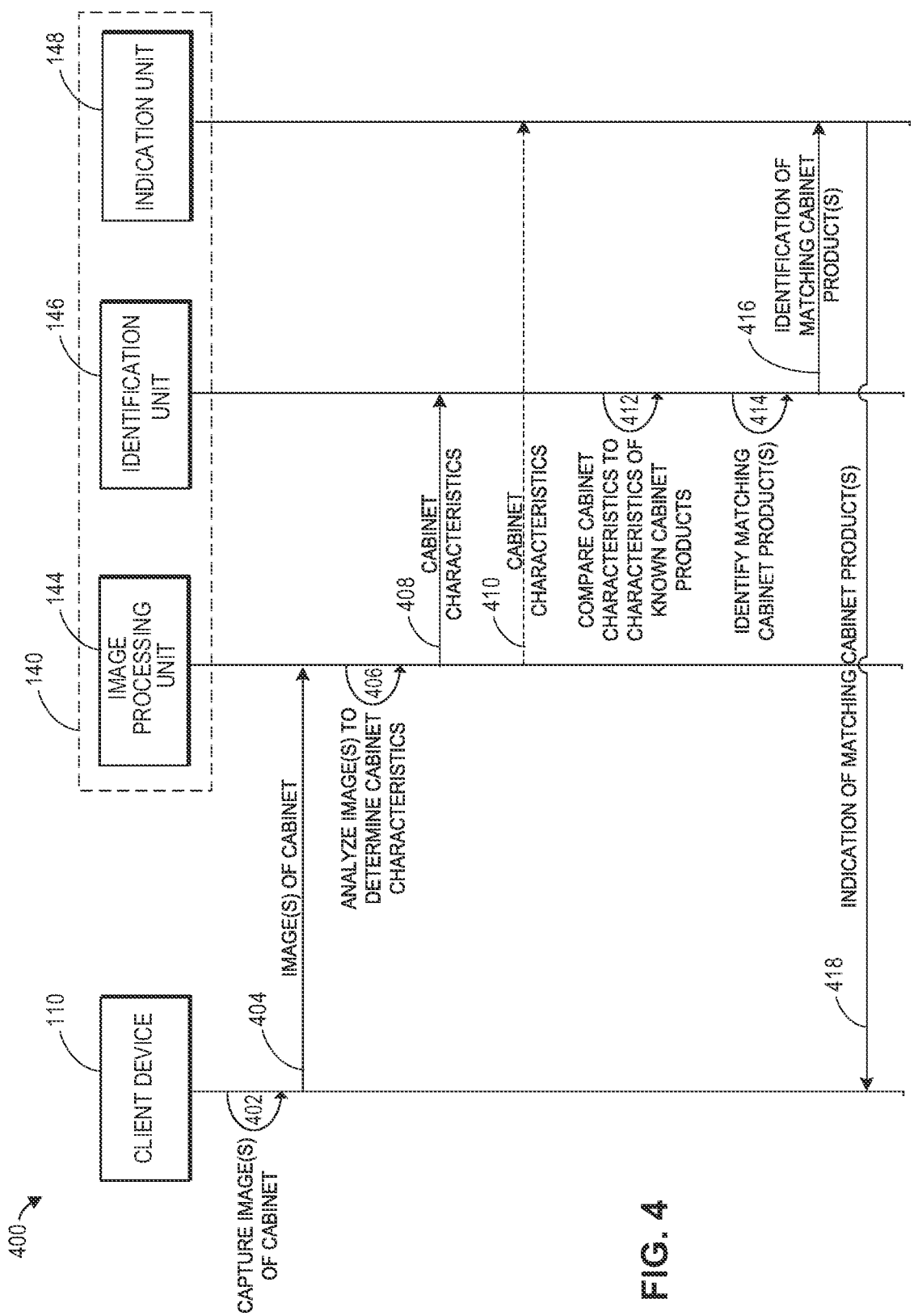
FIG. 4 depicts a signal diagram associated with identifying cabinet products, in accordance with some embodiments.

For further clarity, FIG. 4 depicts a signal diagram 400 associated with identifying cabinet products, in accordance with some embodiments. The signal diagram 400 may begin when the client device 110 captures 402 one or more image(s) depicting a cabinet. For example, the image capture device 124 may capture the image(s). In some embodiments, the client device 110 may capture the image(s) via a dedicated software application implemented on the client device 110. The client device 110 may present instructions to a user of the client device 110 regarding how to capture the image(s). Further, the client device 110 may perform initial processing, or transmit the image(s) to the server 140 for initial processing. The initial processing may determine whether the image(s) are of a high enough quality (e.g., number of pixels, depict a cabinet in accordance with the presented instructions, etc.). The client device 110 then transmits 404 the image(s) to the server 140.

The image processing unit 144 of the server 140 analyzes the image(s) to determine characteristics of the depicted cabinet. The image processing unit 144, for example, can analyze the image(s) using a machine learning model, as discussed above with reference to FIG. 3. Alternatively or additionally, the image processing unit 144 can analyze the image(s) using any suitable object detection techniques, such as deep learning techniques, auto encoders, multilayer perceptron (MLP) models, neural networks such as recurrent neural networks (RNN), restricted Boltzmann machines (RBM), self-organizing maps (SOM), self-organizing feature maps (SOFM), or convolutional neural networks, and/or other types of models, techniques, algorithms, calculations, or the like. The image processing unit 144 provides 408 the identified cabinet characteristics to the identification unit 146 for further processing. In some embodiments, the image processing unit 144 may also provide 410 the identified cabinet characteristics to the indication unit 148.

The identification unit 146 of the server 140 compares 412 the identified cabinet characteristics to characteristics of known cabinet products. The identification unit 146 may access characteristics of known cabinet products stored in the cabinet product characteristics database 149 or a memory of the server 140. In some embodiments, the identification unit 146 may perform the comparison by analyzing the identified cabinet characteristics using a machine learning model trained using data from the cabinet product characteristics database, as discussed above with reference to FIG. 3.

Based on the analysis, the identification unit 146 identifies 414 one or more matching cabinet products. A matching cabinet product can be a complete cabinet or one or more cabinet components (e.g., a cabinet box, drawers, doors, cabinet framing, molding, hardware, etc.). Additionally or alternatively, the identification unit 146 may identify one or more similar cabinet products. Similar cabinet products may "match" the depicted cabinet within a larger threshold than a "matching" cabinet product. The identification unit 146 provides 416 an identification of the one or more matching (and/or similar) product(s) to the indication unit 148. In some implementations, functions of the image processing unit 144 and the identification unit 146 may be performed using a machine learning model that both identifies cabinet characteristics and identifies matching and/or similar cabinet product(s).

The indication unit 148 of the server 140 transmits 418, via the communication interface 142, an indication of the matching (and/or similar) product(s) to the client device 110. As discussed above, the indication may include information corresponding to the matching (and/or similar) product(s), such as an identification of the product(s) (e.g., a manufacturer, a part or model number, a product name, etc.). The indication may also include information indicating where a matching product is available for purchase (e.g., the name, contact information, website link, and/or address of a retail store or retailer). Depending on the embodiment, the indication may indicate whether the product is "matching" (e.g., similar above a first threshold), or similar (e.g., similar below the first threshold but above a second threshold). The client device 110 can present the indication, or information based on the indication, on the display 116, as will be discussed in more detail with reference to FIG. 5B.

Figure 5A:
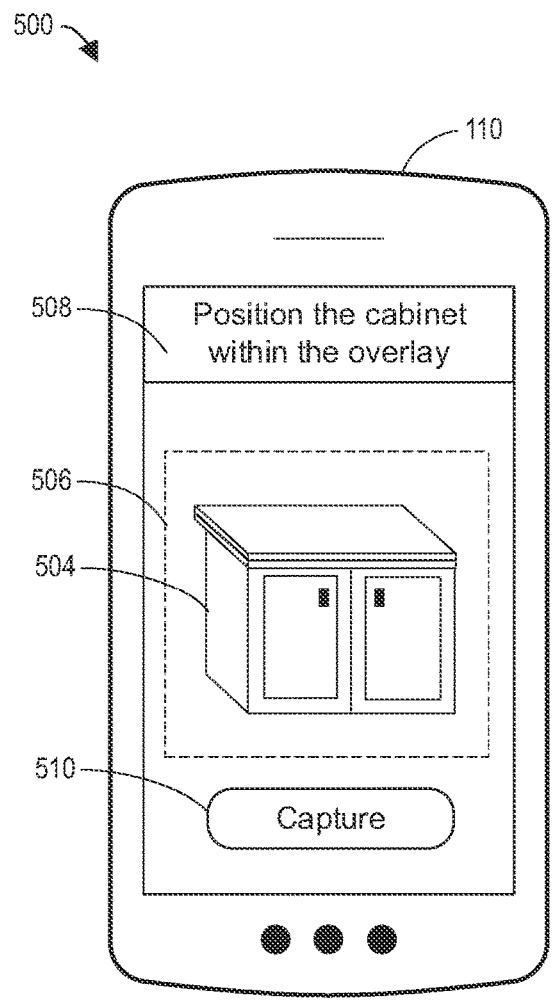
FIGS. 5A-5B depict example interfaces for capturing an image of a cabinet and receiving an indication of an identified cabinet product, in accordance with some embodiments.
Figure 5B:
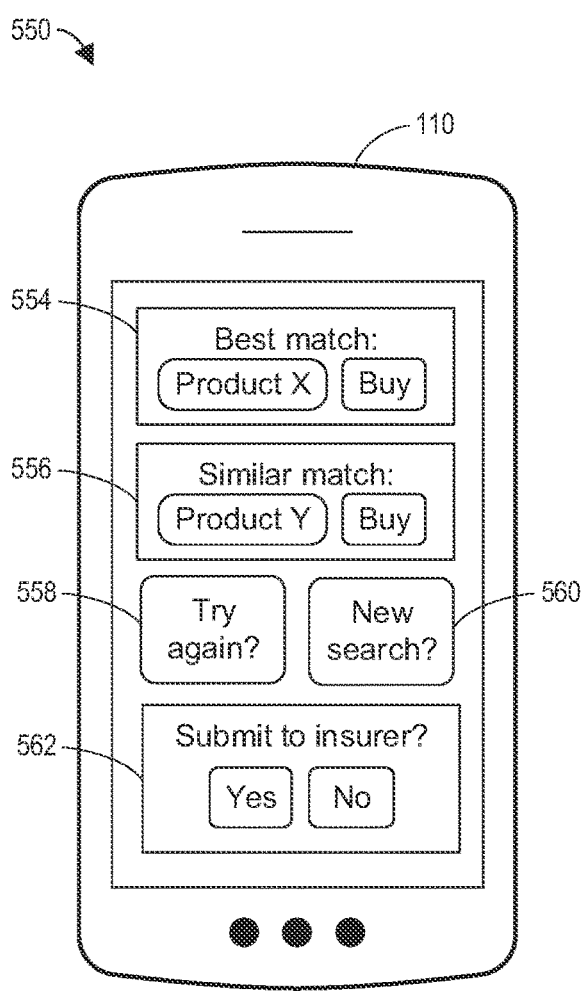

FIGS. 5A-5B depict exemplary interfaces 500 and 550, respectively, associated with the techniques disclosed herein. The client device 110 may present the interfaces 500 and 550 on the display 116 as instances of a GUI of a dedicated software application. Additionally or alternatively, the client device 110 may present one or both of the interfaces 500 and 550 based on user selections in a web browser.

The client device 110 may display the interface 500, depicted in FIG. 5A, when a user is capturing an image of a cabinet 504. The interface 500 may include an overlay 506 that the client device 110 can superimpose over the view of the image capture device 124. The interface 500 may include instructions that guide a user to capture various images. For example, an instruction 508 may instruct a user to position the cabinet 504 within the overlay 506 before capturing an image. Other instructions may guide a user on what images to capture, from which angles, and how to position the cabinet 504. For instance, an instruction may ask the user to open the drawers and/or doors of the cabinet 504 before capturing an image, as in FIG. 2B.

The interface 500 may also include a user-selectable option 510 to capture an image. After an image is captured, the client device 110 may prompt the user to capture additional pictures of the cabinet 504. The client device 110 may prompt the user to capture a replacement picture, for example if the client device 110 determines that the quality of the image is too low for proper processing, or if the captured image does not comply with the instructions. The client device 110 may present new instructions guiding the user on how to capture an improved image, such as "try capturing the image with additional ambient light."

After the client device 110 captures one or more image(s), and these image(s) are processed using the techniques disclosed herein, the client device 110 may present the interface 550, depicted in FIG. 5B, which includes the results of the analysis. The interface 550 can display any of the information that the server 140 transmits to the client device 110 at the event 418. For example, the interface 550 may include an indication 554 of a "best" match (i.e., a matching cabinet product "Product X"). The interface 550 may also include an indication 556 of a "similar" match (i.e., a similar cabinet product "Product Y", which may be similar to the cabinet 504 within a larger tolerance than the matching cabinet product). The indications 554 and 556 may include user-selectable options a user can select to receive additional information concerning the products and/or links to a website where the products are available for purchase. The indications 554 and 556 may also indicate an estimate of the confidence in the predicted matching or similar cabinet product. For example, the confidence may be 100%, 90%, 80%, etc. In some embodiments, the interface 550 may include identified cabinet characteristics of the cabinet 504, such as the color, style, dimensions, material, etc.

In some implementations, the interface 550 may include a user-selectable option 558 that a user can select to "try again" or otherwise indicate to the client device 110 that the matching or similar cabinet products are not acceptable matches to the cabinet 504. The client device 110 can request that the server 104 re-process the existing images, or can prompt the user for additional information or images of the cabinet 504, and can re-initialize the image processing. The interface 550 may also include a user-selectable option 560 that a user can select to initialize the process for a different cabinet or using different images.

In one example, the interface 550 may include a user-selectable option 562 that a user can select to submit the matching and/or similar identified cabinet product to an insurer. The client device 110 may transmit the information to the server 140, or to another computing device, which may populate one or more fields relating to an insurance claim relating to the cabinet 504 (e.g., to facilitate determining a repair or settlement cost).

Figure 6:
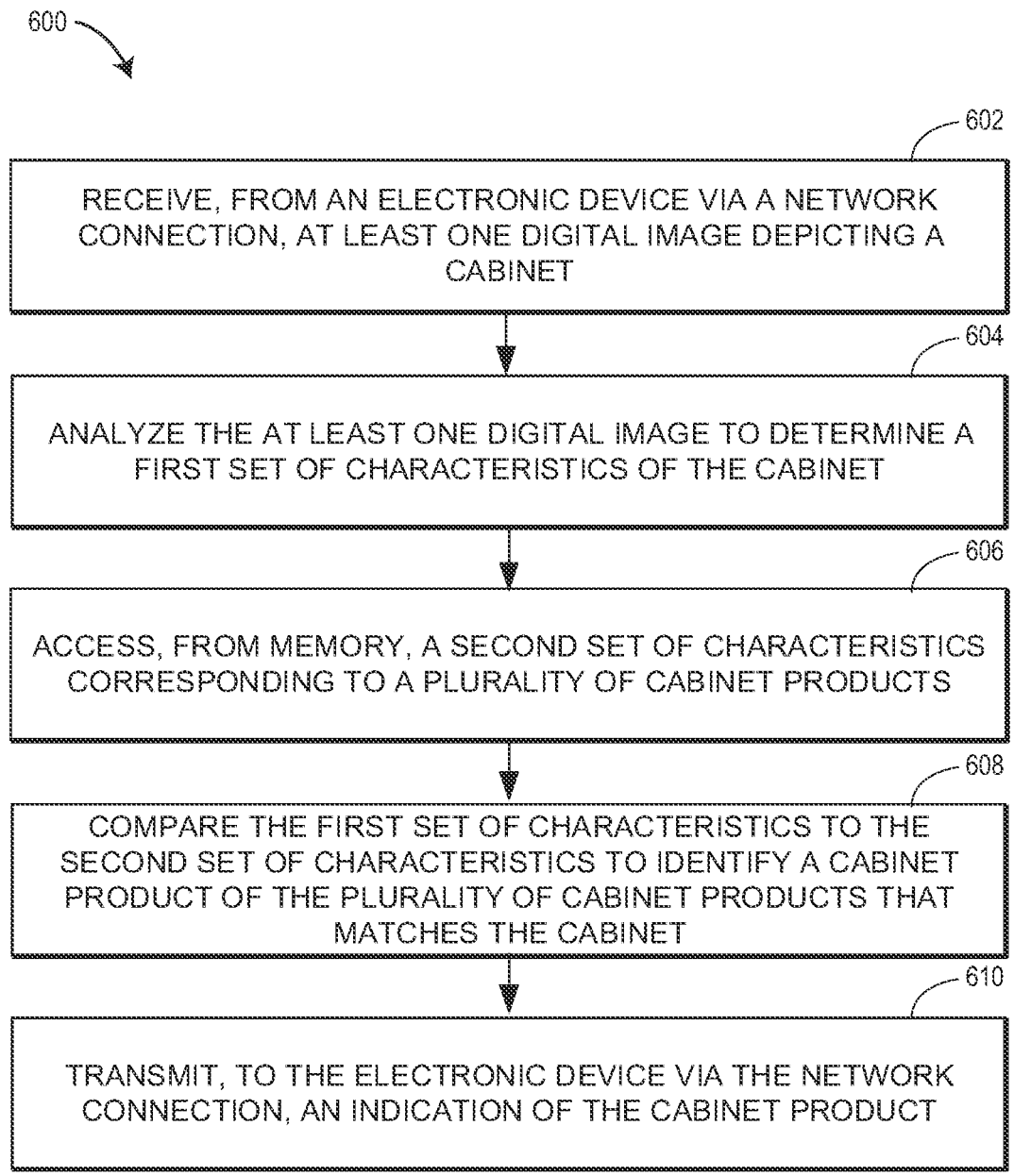
FIG. 6 depicts a flow diagram of an exemplary method of cabinet product identification.

FIG. 6 depicts a flow diagram of an exemplary method 600 of cabinet identification. The method 600 can be implemented as a set of instructions stored on a computer-readable memory and executable on one or more processors. The method 600 may be performed by one or more processors of the server 140, for example, or of the client device 110. The method 600 may begin when the processors receive (block 602) at least one digital image depicting a cabinet from an electronic device (e.g., the client device 110) via a network connection (e.g., a connection to the network 130 via the communication interface 142) (e.g., event 404 of FIG. 4). For example, the processors may receive the digital image from a camera (e.g., the image capture device 124) of the electronic device that captured the digital image. In some implementations, the processors may receive the digital image in response to transmitting a request for a digital image depicting a digital image depicting a particular view of the cabinet.

The processors may analyze (block 604) the at least one digital image to determine a first set of characteristics of the cabinet (e.g., event 406). The first set of characteristics may include, for example: a material type, a manufacturer, a brand, a cabinet measurement, a door measurement, a door style, a molding style, a type of hinge, a hinge location, a hardware location, a frame style, whether the cabinet is a custom cabinet or a pre-fabricated cabinet, etc. The processors may analyze the digital image using any suitable object detection technique, such as a machine learning model.

The processors may access (block 606), from memory (e.g., from the cabinet product characteristics database 149), a second set of characteristics corresponding to a plurality of cabinet products. Next, the processors may compare (block 608) the first set of characteristics to the second set of characteristics to identify a cabinet product of the plurality of cabinet products that matches the cabinet depicted in the at least one digital image (e.g., events 412 and 414). The processors may analyze the first of characteristics using a machine learning model, which may be the same or different as a machine learning model that analyzes the digital image to determine characteristics of the cabinet. A machine learning model may be trained using one or more of digital images of the plurality of cabinet products or characteristics of the plurality of cabinet products.

The processors may transmit, to the electronic device via the network connection, an indication of the cabinet product, such as an identification of the cabinet product (e.g., event 418). In some implementations, the processors may determine a retail store or a website where the cabinet product is available for purchase, and transmit an indication of the retail store or the website to the electronic device. Further, in some embodiments, the processors may transmit an indication of the first set of characteristics to the electronic device.

ADDITIONAL CONSIDERATIONS

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed:

1. A computer-implemented method of cabinet product identification, the method comprising:
   receiving, from an electronic device via a network connection, at least one digital image depicting a cabinet;
   analyzing, by one or more processors, the at least one digital image to determine a first set of characteristics of the cabinet;
   accessing, by the one or more processors from memory, a second set of characteristics corresponding to a plurality of cabinet products;
   comparing, by the one or more processors, the first set of characteristics to the second set of characteristics to identify a cabinet product of the plurality of cabinet products that matches the cabinet; and transmitting, to the electronic device via the network connection, an indication of the cabinet product.

2. The computer-implemented method of claim 1, wherein analyzing the at least one digital image:

analyzing the at least one digital image to determine one or more of: a material type, a manufacturer, a brand, a cabinet measurement, a door measurement, a door style, a molding style, a type of hinge, a hinge location, a hardware location, or a frame style.

3. The computer-implemented method of claim 1, wherein analyzing the at least one digital image includes:

analyzing the at least one digital image to determine whether the cabinet is a custom cabinet or a prefabricated cabinet.

4. The computer-implemented method of claim 1, wherein receiving the at least one digital image includes:

receiving the at least one digital image from a camera of the electronic device that captured the at least one digital image depicting the cabinet.

5. The computer-implemented method of claim 1, further comprising:

determining, by the one or more processors, a retail store or a website where the cabinet product is available for purchase; and transmitting, to the electronic device via the network connection, an indication of the retail store or the website.

6. The computer-implemented method of claim 1, wherein receiving the at least one digital image includes:

transmitting, to the electronic device via the network connection, a request for a digital image depicting a particular view of the cabinet;

receiving, in response to transmitting the request, the at least one digital image.

7. The computer-implemented method of claim 1, wherein analyzing the at least one digital image includes:

analyzing the at least one digital image using a machine learning model.

8. The computer-implemented method of claim 1, wherein comparing the first set of characteristics to the second set of characteristics includes:

analyzing the first set of characteristics using a machine learning model trained using one or more of the second set of characteristics or image data including the plurality of cabinet products.

9. The computer-implemented method of claim 8, wherein analyzing the at least one digital image includes:

analyzing the at least one digital image using the machine learning model.

10. The computer-implemented method of claim 1, further comprising:

transmitting, to the electronic device via the network connection, an indication of one or more characteristics of the first set of characteristics.

11. A computing system for cabinet product identification, the computing system comprising:

a transceiver in communication with an electronic device via a network connection;

one or more processors; and a program memory storing instructions that, when executed by the one or more processors, cause the one or more processors to:

receive, from an electronic device via the transceiver, at least one digital image depicting a cabinet;

analyze the at least one digital image to determine a first set of characteristics of the cabinet;

access from memory a second set of characteristics corresponding to a plurality of cabinet products;

compare the first set of characteristics to the second set of characteristics to identify a cabinet product of the plurality of cabinet products that matches the cabinet; and transmit, to the electronic device via the transceiver, an indication of the cabinet product.

12. The system of claim 11, wherein the instructions cause the one or more processors to analyze the at least one digital image by:

analyzing the at least one digital image to determine one or more of: a material type, a manufacturer, a brand, a cabinet measurement, a door measurement, a door style, a molding style, a type of hinge, a hinge location, a hardware location, or a frame style.

13. The system of claim 11, wherein the instructions cause the one or more processors to analyze the at least one digital image by:

analyzing the at least one digital image to determine whether the cabinet is a custom cabinet or a prefabricated cabinet.

14. The system of claim 11, wherein the instructions cause the one or more processors to receive the at least one digital image by:

receiving the at least one digital image from a camera of the electronic device that captured the at least one digital image depicting the cabinet.

15. The system of claim 11, wherein the instructions further cause the one or more processors to:

determine a retail store or a website where the cabinet product is available for purchase; and transmit, to the electronic device via the network connection, an indication of the retail store or the website.

16. The system of claim 11, wherein the instructions cause the one or more processors to receive the at least one digital image by:

transmitting, to the electronic device via the network connection, a request for a digital image depicting a particular view of the cabinet;

receiving, in response to transmitting the request, the at least one digital image.

17. The system of claim 11, wherein the instructions cause the one or more processors to analyze the at least one digital image by:

analyzing the at least one digital image using a machine learning model.

18. The system of claim 11, wherein the instructions cause the one or more processors to compare the first set of characteristics to the second set of characteristics by:

analyzing the first set of characteristics using a machine learning model trained using one or more of the second set of characteristics or image data including the plurality of cabinet products.

19. The system of claim 18, wherein the instructions cause the one or more processors to analyze the at least digital image by:

analyzing the at least one digital image using the machine learning model.

20. The system of claim 11, wherein the instructions further cause the one or more processors to:

transmit, to the electronic device via the network connection, an indication of one or more characteristics of the first set of characteristics.

\* \* \* \* \*